US009906787B2

(12) United States Patent
Amon et al.

(10) Patent No.: US 9,906,787 B2
(45) Date of Patent: Feb. 27, 2018

(54) METHOD AND APPARATUS FOR ENCODING AND DECODING VIDEO SIGNAL

(75) Inventors: Peter Amon, München (DE); Andreas Hutter, München (DE); Robert Kutka, Geltendorf (DE); Norbert Oertel, Landshut (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 963 days.

(21) Appl. No.: 13/811,211

(22) PCT Filed: Jul. 20, 2011

(86) PCT No.: PCT/EP2011/062449
§ 371 (c)(1),
(2), (4) Date: Jan. 18, 2013

(87) PCT Pub. No.: WO2012/010631
PCT Pub. Date: Jan. 26, 2012

(65) Prior Publication Data
US 2013/0114702 A1 May 9, 2013

(30) Foreign Application Priority Data

Jul. 20, 2010 (EP) .................................... 10007523
Jan. 21, 2011 (EP) .................................... 11151706

(51) Int. Cl.
*H04N 7/50* (2006.01)
*H04N 19/583* (2014.01)
(Continued)

(52) U.S. Cl.
CPC ....... *H04N 19/00733* (2013.01); *H04N 19/51* (2014.11); *H04N 19/523* (2014.11);
(Continued)

(58) Field of Classification Search
CPC ............ H04N 19/00733; H04N 19/51; H04N 19/523; H04N 19/573; H04N 19/59; H04N 19/61
(Continued)

(56) References Cited

U.S. PATENT DOCUMENTS 6,269,174 B1 * 7/2001 Koba et al. .................... 382/107
7,643,690 B2 1/2010 Suzuki et al.
(Continued)

FOREIGN PATENT DOCUMENTS

CN 101018333 8/2007
CN 101478671 7/2009
(Continued)

OTHER PUBLICATIONS

Park, S.C. et al "Super-Resolution Image Reconstruction: A technical Overview" IEEE signal processing magazine May 2003 pp. 21-36.*
(Continued)

*Primary Examiner* — Jessica M Prince
(74) *Attorney, Agent, or Firm* — Slayden Grubert Beard PLLC (57) ABSTRACT

An encoder encodes a video signal formed of video frames, each including image blocks. The encoder includes a processing unit which calculates at least one high resolution reference image block on the basis of previously encoded image blocks by executing a super resolution algorithm to perform a local motion compensation; and a motion compensation unit which calculates on the basis of the calculated high resolution reference image block a temporal predictor which is subtracted from a current image block of the video signal. Together, the encoder and a corresponding decoder improve the signal quality of a video signal significantly.

16 Claims, 4 Drawing Sheets

(51) Int. Cl.
*H04N 19/51* (2014.01)
*H04N 19/61* (2014.01)
*H04N 19/523* (2014.01)
*H04N 19/573* (2014.01)
*H04N 19/59* (2014.01)

(52) U.S. Cl.
CPC ........... *H04N 19/573* (2014.11); *H04N 19/59* (2014.11); *H04N 19/61* (2014.11)

(58) Field of Classification Search
USPC ........................................................ 375/240
See application file for complete search history.

(56) References Cited

U.S. PATENT DOCUMENTS

| | | | |
|---|---|---|---|
| 8,023,754 B2 | 9/2011 | Suzuki et al. | |
| 2001/0021303 A1 | 9/2001 | Bruls et al. | |
| 2003/0053544 A1* | 3/2003 | Yasunari | H04N 5/145 375/240.16 |
| 2003/0086498 A1* | 5/2003 | Lee | H04N 5/145 375/240.16 |
| 2006/0126952 A1 | 6/2006 | Suzuki et al. | |
| 2007/0019887 A1* | 1/2007 | Nestares | G06T 3/4053 382/299 |
| 2008/0239151 A1* | 10/2008 | Tomonaga | G06T 3/4023 348/581 |
| 2009/0010568 A1* | 1/2009 | Nakagami | H04N 5/14 382/299 |
| 2009/0110285 A1* | 4/2009 | Elad | G06T 3/4053 382/190 |
| 2009/0147847 A1* | 6/2009 | Ishii | H04N 19/139 375/240.13 |
| 2010/0054338 A1 | 3/2010 | Suzuki et al. | |
| 2010/0086048 A1* | 4/2010 | Ishtiaq | H04N 19/105 375/240.16 |
| 2010/0119176 A1* | 5/2010 | Ichihashi | G06T 3/403 382/300 |
| 2010/0150229 A1* | 6/2010 | Francois | H04N 19/70 375/240.12 |
| 2010/0226432 A1 | 9/2010 | Wittmann et al. | |
| 2010/0272184 A1* | 10/2010 | Fishbain et al. | 375/240.16 |

FOREIGN PATENT DOCUMENTS

| | | | |
|---|---|---|---|
| EP | 1906357 A1 * | 4/2008 | ............... G06T 3/40 |
| EP | 10007523.3 | 7/2010 | |
| EP | 11151706.6 | 1/2011 | |
| JP | 2006-174415 | 6/2006 | |
| JP | 2008-17241 | 1/2008 | |
| WO | 2010/007719 A1 | 1/2010 | |
| WO | 2010/021108 A1 | 2/2010 | |

OTHER PUBLICATIONS

Tarannum N et al : "Transform Domain Super Resolution for Improved Motion Compensated Prediction" Proceedings of the 2010 IEEE International Symposium on Circuits and Systems (ISCAS 2010), May 30, 2010 (May 30, 2010), pp. 2187-2190.*
Office Action dated Mar. 6, 2015 in corresponding Chinese Patent Application No. 201180035351.0.
English Translation of Japanese Office Action dated Feb. 17, 2014 in corresponding Japanese Application No. 2013-520140.
Office Action dated Oct. 9, 2015 in corresponding Chinese Patent Application No. 201180035351.0.
Office Action dated Dec. 15, 2015 in corresponding European Patent Application No. 11 740 866.6.
International Search Report for PCT/EP2011/062449, dated Oct. 7, 2011.
N. Tarannum et al.; Transform-Domain Super Resolution for Improved Motion-Compensated Prediction; Proceedings of the 2010 IEEE International Symposium on Circuits and Systems, May 2010; pp. 2187-2190.
R. Schultz et al.; "Extraction of High-Resolution Frames from Video Seuences"; IEEE Transactions on Image Processing, vol. 5, No. 6, Jun. 1996, pp. 996-1011.
S.C. Park et al.; "Super-Resolution Image Reconstruction: A Technical Overview"; IEEE Signal Processing Magazine, vol. 20, No. 3, May 2003, pp. 21-36.
C.A. Segall et al.; "High-Resolution Images from Low-Resolution Compressed Video"; IEEE Signal Processing Magazine, vol. 20, No. 3, May 2003, pp. 37-48.

* cited by examiner

METHOD AND APPARATUS FOR ENCODING AND DECODING VIDEO SIGNAL

This application is the U.S. national stage of International Application No. PCT/EP2011/062449, filed Jul. 20, 2011 and claims the benefit thereof. The International Application claims the benefit of European Application No. 10007523 filed on Jul. 20, 2010 and European Application No. 11151706.6 filed on Jan. 21, 2011, all applications are incorporated by reference herein in their entirety.

BACKGROUND

Described below are an apparatus and a method for encoding and decoding a video signal formed of video frames each including image blocks.

In video coding, similarities between images in a video sequence are exploited in order to reduce size and thereby a data rate of the compressed bit stream. For video encoding a temporal predictor from previously encoded frames is generated. This temporal predictor is subtracted from the current frame to provide a prediction error which is further encoded using for example a discrete cosine transformation (DCT). The generated transform coefficients are quantized by a quantization unit, and an entropy encoder performs entropy coding of the quantized coefficients.

Figure 1:
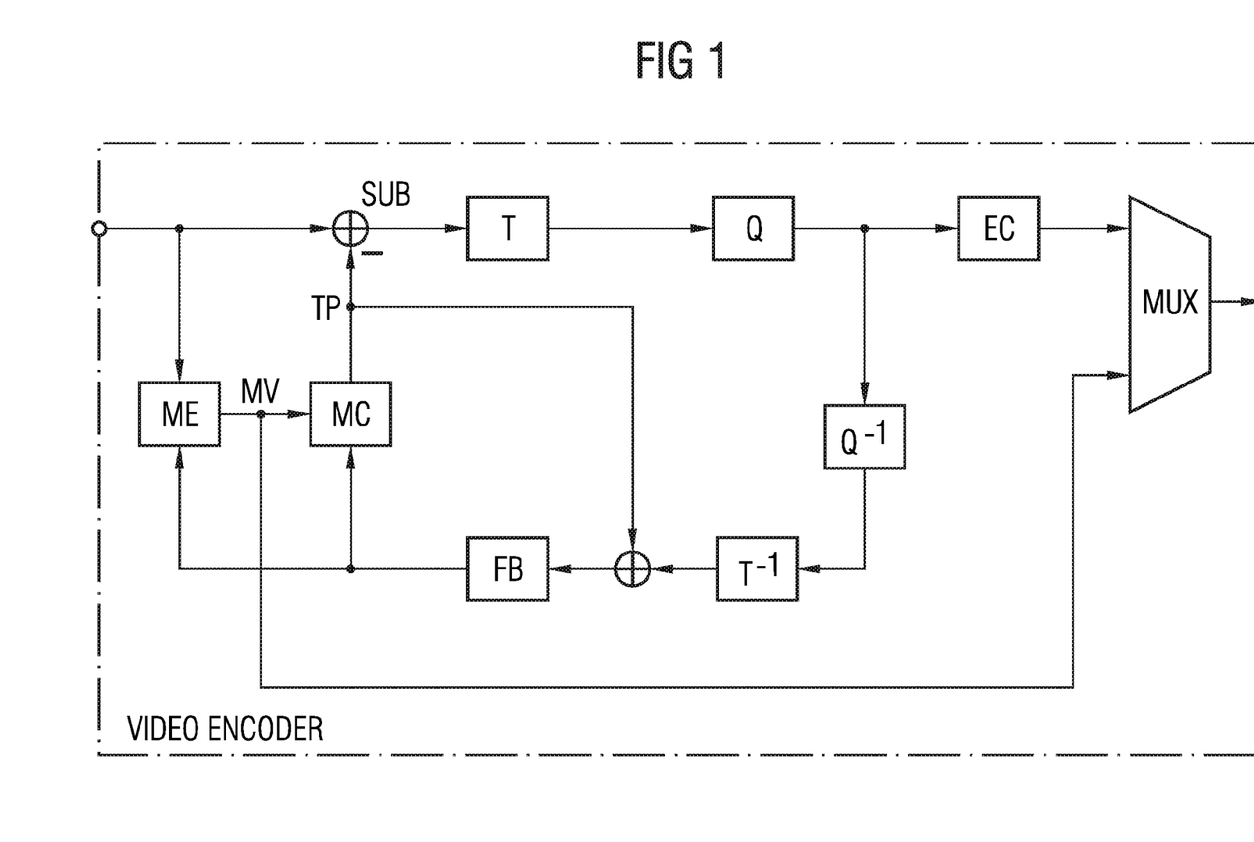
FIG. 1 is a block diagram of a known video encoder.

FIG. 1 shows a block diagram of a known video encoding apparatus VENC using temporal prediction. A frame received at an input of the encoder is supplied to a motion estimation unit ME which supplies a motion vector MV to a motion compensation unit MC which calculates a temporal predictor TP supplied to a subtractor. The motion estimation unit ME and the motion compensation unit MC are connected on the input side to a frame buffer FB. This frame buffer FB can be a memory for storing a reference frame. The motion vector MV calculated by the motion estimation unit ME can also be supplied to a multiplexer MUX and transmitted via a communication channel to a decoder. Further, the known encoder as shown in FIG. 1 may be an inverse quantization unit $Q^{-1}$ which reverses the indexing step of quantization and supplies a signal to an inverse transformation unit $T^{-1}$, which forms an inverse transformation.

In current video coding standards like H.264/AVC, the motion vectors MV calculated by the motion estimation unit ME are developed for rectangular regions of the image, so-called image blocks. These image blocks can have different sizes, e.g. 4×4, 8×8, 16×16, 8×4 and 8×16 pixels. In order to calculate an accurate temporal predictor TP, a displacement with the accuracy of full pixels, i.e. the pixels to be encoded, is not sufficient, since a real motion cannot be captured accurately. Accordingly, a sub-pixel motion compensation, for example with an accuracy of half-pixel elements or half-pixels improve to model a translatory motion and thus to generate a more accurate temporal predictor TP. Accordingly, the sub-pixel motion compensation reduces the prediction error transformed by the transformation unit T and consequently the size and data rate of the encoded bit stream. Since pixel values at sub-pixel positions do not exist in the original video data stream, they are generated in a known encoding apparatus by interpolation. To calculate the pixel values at sub-pixel positions interpolation is performed by using filtering operations. Different filter lengths can be used such as a 2-tap bilinear filter or a 6-tap filter as defined in the H.264/AVC standard. These filters approximate an optimal interpolation process of the sin c function defined by sin c $(x)=\sin(x)/x$. A provided virtual high-resolution image can then be used as a temporal prediction in the motion estimation and motion compensation process employed by the video encoder.

However, a known encoding and decoding process using interpolation has the drawback that high spatial frequencies not present in the original images having a frequency above Nyquist frequency cannot be regenerated this way.

SUMMARY

Accordingly, described below are an encoding and decoding method which improves the accuracy of the prediction and thus the performance and signal quality of the signal undergoing the encoding and decoding process.

Described below is an encoder for encoding a video signal formed of video frames each including image blocks, wherein the encoder includes a processing unit which calculates at least one high resolution reference image block on the basis of previously encoded image blocks by executing a super resolution algorithm to perform a local motion compensation; and a motion compensation unit which calculates on the basis of the calculated high resolution reference image block a temporal predictor, which is subtracted from a current image block of the video signal.

According to one embodiment, the processing unit may be configured to calculate the at least one high resolution reference image block in the spatial domain.

According to a further embodiment, the processing unit may be configured to use block based and/or mesh based motion compensation schemes in executing the super resolution algorithm.

In a further embodiment, the encoder includes a motion estimation unit which performs a motion estimation depending on the current image block of the video signal and the calculated high resolution reference image block to provide a motion vector for the current image block of the video signal, wherein the motion vector is supplied to the motion compensation unit of the encoder.

In a possible implementation of the encoder, the motion compensation unit and the motion estimation unit can include filters for sub-pixel motion compensation.

In a possible embodiment of the encoder, a data memory is provided having several buffers for storing a predetermined number of previously encoded image blocks supplied to the processing unit.

In a still further possible embodiment, the encoder includes a transformation unit which transforms the motion compensated current image block of the video signal into a frequency domain signal which is quantized by a quantization unit of the encoder to provide a quantized signal applied to an entropy encoder of the encoder.

The encoder in a further possible embodiment includes a multiplexing unit which is provided for multiplexing the entropy encoded quantized signal provided by the entropy encoder of the encoder with parameter information data of the super resolution algorithm employed by the processing unit of the encoder and/or a motion vector provided by the motion estimation unit of the encoder.

The output signal of the multiplexing unit includes the entropy encoded quantized signal and can be transmitted via a wireless or wired transmission medium to a decoder.

Alternatively, the multiplexed signal including the entropy encoded quantized signal can be stored in a data storage medium.

In a possible implementation of the encoder, the multiplexed parameter information data of the super resolution algorithm employed by the processing unit of the encoder include a number of previously encoded reference images or image blocks and/or indices of previously encoded reference image blocks used by the respective super resolution algorithm.

In a further possible implementation, the multiplexed parameter implementation data of the super resolution algorithm can include a type of the used super resolution algorithm.

In a further possible implementation, the multiplexed parameter information data of the super resolution algorithm include filter parameters of filters used by the respective super resolution algorithm.

In a further possible implementation, the multiplexed parameter information can also include a block mode indicator indicating whether the respective super resolution algorithm is used for a portion of the current image block or for the complete current image block.

In a further possible embodiment of the encoder, a processing unit and a motion compensation unit of the encoder are adapted to process a two-dimensional video signal generated by a camera.

In a further possible embodiment of the encoder, the processing unit and the motion compensation unit of the encoder are adapted to process a three-dimensional video signal generated by a camera.

In a possible implementation of the encoder, the processing unit and the motion compensation unit of the encoder are adapted to process the two- or three-dimensional video signal in real time.

Alternatively, the processing can be performed off-line.

Described below is an encoding method for encoding a video signal formed of video frames each including image blocks, wherein the encoding method includes: generating at least one high resolution reference image block which is calculated on the basis of previously encoded image blocks by a super resolution algorithm to perform a local motion compensation, and calculating on the basis of the calculated high resolution reference image block a temporal predictor which is subtracted from a current image block.

According to one embodiment the super resolution algorithm may include:
(a1) using oversampling filters to create images being multiple in size in each dimension;
(a2) performing pixel matching on the oversampled images, when a matching algorithm detects corresponding pixels of objects in the images; and
(a3) performing a motion compensation algorithm on the oversampled and pixel-matched images.

Optionally, the super resolution algorithm may further include:
(a4) superposing the motion compensated images to create a high bit depth image; and
(a5) reconstructing high frequencies in the high bit depth image by using a band-pass filter.

In a possible implementation of the encoding method, the motion compensated current image block of the video signal is transformed into a frequency domain signal which is quantized to provide a quantized signal which is then entropy encoded.

The entropy encoded quantized signal can be multiplexed in a possible embodiment with additional data in particular with the motion estimation vector and/or parameters of the used super resolution algorithm.

In a possible embodiment of the encoding method, the parameters of the used super resolution algorithm and/or motion vectors provided by the motion estimation are encoded as side information or as part of the encoded signal.

Also described below is a decoder for decoding a video signal formed of video frames each including image blocks, wherein the decoder includes a processing unit which calculates at least one high resolution reference image block on the basis of previously decoded image blocks by executing a super resolution algorithm to perform a local motion compensation; and a motion compensation unit which calculates on the basis of the high resolution reference image block a temporal predictor which is added to a prediction error block of the received video signal.

According to one embodiment, the processing unit of the decoder may be configured to calculate the at least one high resolution reference image block in the spatial domain.

According to a further embodiment, the processing unit of the decoder may be configured to use block based and/or mesh based motion compensation schemes in executing the super resolution algorithm.

In a possible embodiment, the decoder further includes a demultiplexing unit which is provided for demultiplexing the entropy encoded quantized signal, the parameter information data of the super resolution algorithm and the motion vector of the video signal received by the decoder.

In a possible embodiment of the decoder, the demultiplexed parameter information data of the super resolution algorithm includes a number of encoded images or image blocks and/or indices of coded reference images or image blocks used by the respective super resolution algorithm.

The multiplexed parameter information data further include in a possible embodiment a type of the used super resolution algorithm.

The demultiplexed parameter information data can further include in a possible embodiment filter parameters of filters used by the respective super resolution algorithm.

In a further possible embodiment, the demultiplexed parameter information data can include a block-mode indicator indicating whether the respective super resolution algorithm is used for a portion of the current image block or for the complete current image block.

In a possible embodiment of the decoder, the demultiplexed parameter information data provided by the demultiplexing unit is supplied by the demultiplexing unit to the processing unit of the decoder.

BRIEF DESCRIPTION OF THE DRAWINGS

In the following, possible embodiments of the method and apparatus for encoding and decoding of a video signal are described in more detail with reference to the accompanying drawings of which.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

Figure 2:
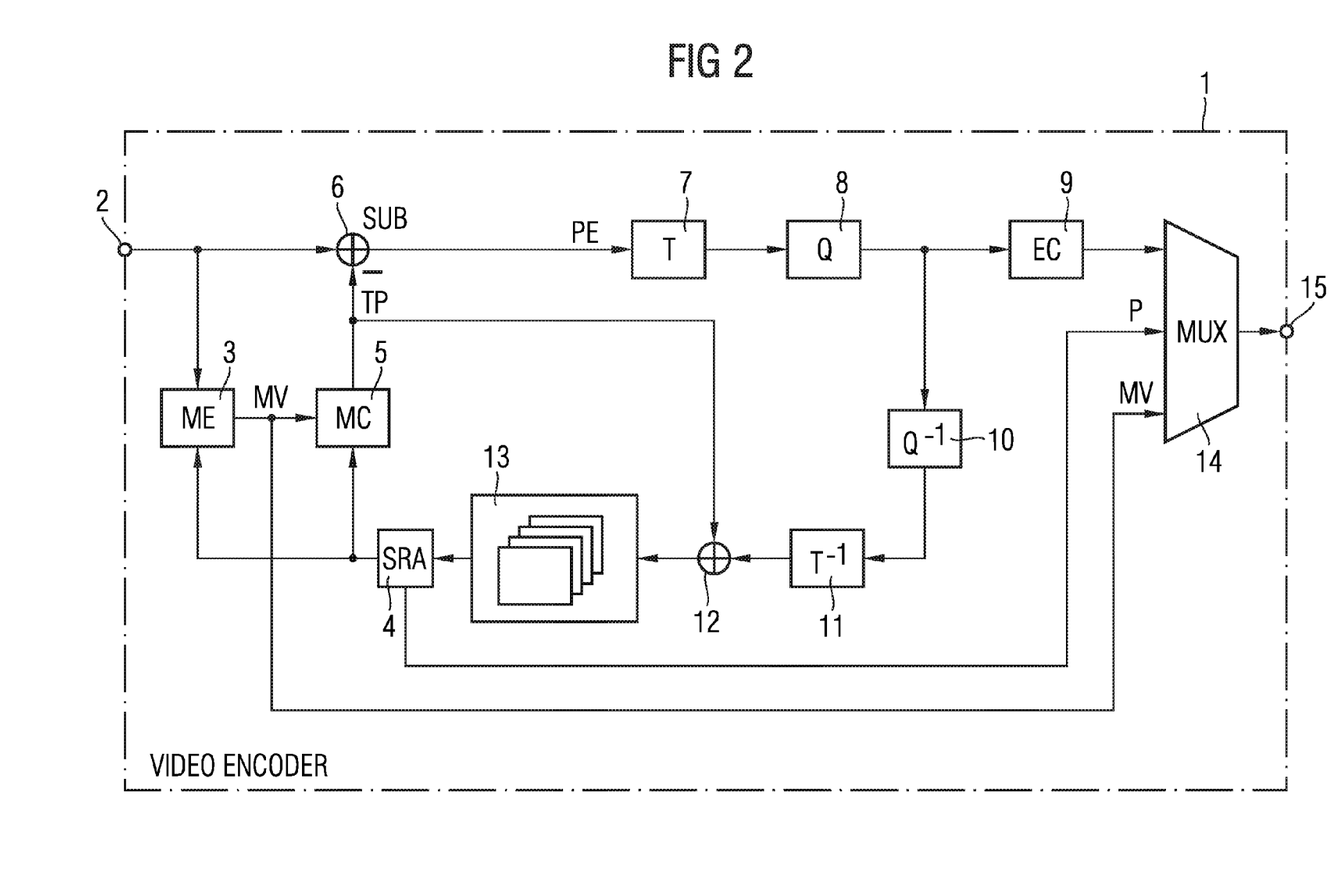
FIG. 2 is a block diagram of a possible implementation of an encoder for encoding a video signal according to a first aspect.

As can be seen in FIG. 2, a video encoder 1 may include in the implementation illustrated in FIG. 2, a signal input 2 for receiving a video sequence formed of video frames wherein each video frame including image blocks. The applied video signal is supplied to a motion estimation unit 3 which performs motion estimation depending on the current image block of the video signal and a calculated high resolution reference image block to provide a motion vector MV for the current image block of the video signal. The high resolution reference image block supplied to the motion estimation unit 3 is calculated by a processing unit, or processor, 4 which calculates the high resolution reference image block on the basis of previously encoded image blocks by executing a super resolution algorithm SRA. The calculated high resolution reference image block is supplied by the processing unit 4 to the motion estimation unit 3 and a motion compensation unit 5 including a video processor. The video processor of the motion compensation unit 5 calculates on the basis of the high resolution reference image block and the motion vector MV received from the motion estimation unit 3 a temporal predictor TP. The encoder 1 includes a subtractor 6 which subtracts from the current image block of the video signal the temporal predictor TP provided by the motion compensation unit 5 to calculate a prediction error PE.

The video encoder 1 further includes a transformation unit 7 which transforms the prediction error PE received from the subtractor 6 into a frequency domain signal which is quantized by a subsequent quantization unit 8 of the encoder 1. The quantized signal is then applied to an entropy encoder 9. The quantized signal provided by the quantizing unit 8 is further supplied to an inverse quantization unit 10 which reverses the quantization and a following inverse transformation unit 11 reversing the transformation performed by the transformation unit 7. The transformation unit 7 can for example be a DCT transformation unit.

The output of the inverse transformation unit 11 is connected to an adder 12 adding the temporal predictor TP generated by the motion compensation unit 5 to the output signal of the inverse transformation unit 11.

When the signal of the adder 12 is supplied to a data memory 13 having several buffers for storing, a predetermined number of previously encoded image blocks which can be supplied to the processing unit 4 for performing the super resolution algorithm SRA. The number of buffers within the data memory 13 can vary. In the implementation shown in FIG. 2, the data memory 13 can include four buffers for storing four previously encoded image blocks.

In the embodiment shown in FIG. 2, the encoder 1 further includes a multiplexing unit 14 which is provided for multiplexing the entropy encoded quantized signal supplied by the entropy coder 9 with additional data including possible implementation parameter information data P of the super resolution algorithm SRA employed by the processing unit 4 and/or the motion vector V provided by the motion estimation unit 3. The multiplexed signal provided by the multiplexing unit 14 is output at an output terminal 15 of the encoder 1.

The multiplexed parameter information data P of the super resolution algorithm SRA can include a number of previously encoded reference images or image blocks and/or indices of previously encoded reference images or image blocks used by the respective super resolution algorithm SRA. It is possible that the multiplex parameter information data P can also include a type of the used super resolution algorithm and/or filter parameters of filters used by the respective super resolution algorithm SRA.

In a further possible implementation, the multiplexed parameter information data P can also include a block mode indicator indicating whether the respective super resolution algorithm SRA is used for a portion of the current image block or for the complete current image block.

The encoder 1 as shown in the embodiment of FIG. 2 can be adapted to process a two-dimensional video signal. In a further possible embodiment, the encoder 1, and in particular the processing unit and motion compensation unit of the encoder, can be adapted to process a three-dimensional video signal.

The video signal applied to the input terminal 2 of the encoder 1 can be generated in a possible embodiment by a digital camera. The processing of the applied video signal can be performed by the encoder 1 as shown in FIG. 2 in real-time. It is also possible that the processing of the applied video signal is performed off-line.

The multiplexed signal output at the output terminal 15 of the video encoder 1 can be transmitted via a wired or wireless transmission medium to a decoder. It is also possible that the encoded output signal of the video encoder 1 as shown in FIG. 2 is stored on a data storage medium for further processing.

In a possible implementation, the motion compensation unit 5 can include additional interpolation filters for sub-pixel motion compensation.

Within a video encoder 1 as shown in FIG. 2, a super resolution algorithm SRA is employed for temporal prediction and calculating a temporal predictor TP in a hybrid video coding. For the generation of the super resolution images, a motion compensation in the spatial domain is applied, and especially by usage of local motion compensation (MC) schemes such as block-based motion compensation schemes or mesh-based motion compensation schemes. A global motion compensation is not needed which allows for a more flexible design of the motion compensation and interaction between a regular motion compensation process and the motion compensation employed for pixel matching. In contrast to global motion compensation, several regions with diverging motion can be respected when using local motion compensation such as block-based motion compensation or mesh-based motion compensation.

With the video encoder 1 as shown in the implementation of FIG. 2, previously encoded image blocks are used to generate a higher resolution for the reference image block. This high resolution reference image block or region can be used for motion estimation and motion compensation without the need of generating interpolated image values at sub-pixel positions. In case that image values at an even higher resolution as provided by the super resolution algorithm SRA are needed, a known filtering process, i.e. sub-pixel interpolation, can additionally be applied. Alternatively, the employed resolution algorithm SRA can be adapted such that higher resolutions are provided directly by the SRA algorithm.

In case that the motion information from the motion compensation unit 5 does not fit well with the necessities of the resolution process, new motion information can be sent. Motion vectors MV can be derived separately, but identically on the encoder and decoder side by a specified motion estimation ME algorithm. In a possible implementation motion estimation control information like thresholds can be sent by the encoder 1 to the decoder. In a possible implementation, this motion estimation control information is also multiplexed into the data stream by the multiplexing unit 14.

Figure 3:
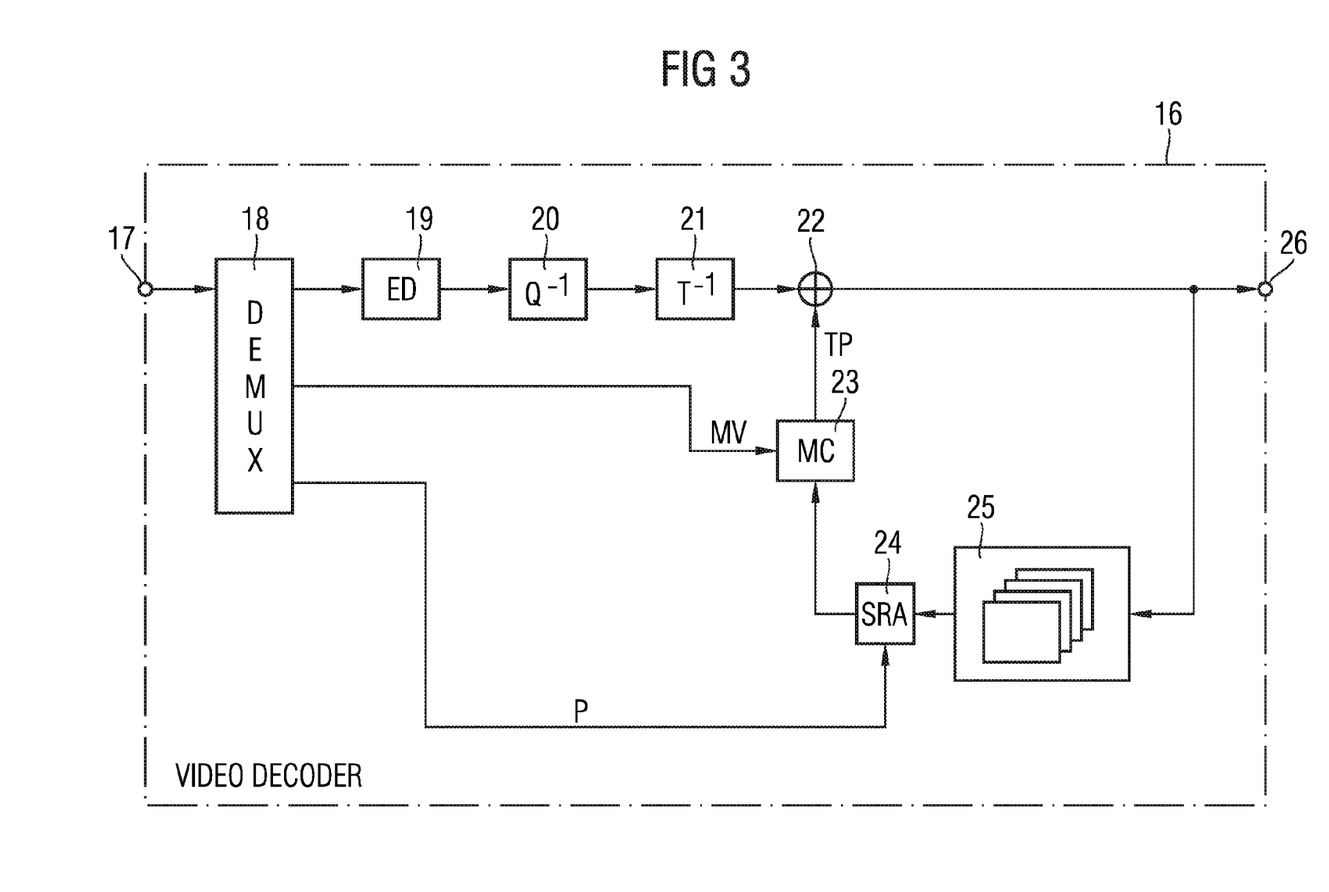
FIG. 3 is a block diagram of a possible implementation of a decoder for decoding a video signal according to a further aspect.

In the embodiment shown in FIG. 2, parameters of the super resolution algorithm SRA are transmitted as multiplexed information from the encoder 1 to the decoder 16 shown in FIG. 3. This information can be transmitted as an integral part of the encoded bit stream or as a separate configuration data stream. Alternatively, it is also possible that the parameters are implicitly derived at the decoder side.

FIG. 3 shows a block diagram of a possible embodiment of a video decoder 16 receiving a bit stream from a video encoder 1 via a data transmission medium. The decoder 16 has an input terminal 17 for receiving the bit stream. A demultiplexing unit 18 is provided in the shown embodiment for demultiplexing the entropy encoded quantized signal, the parameter information data P as well as the motion vector MV of the received video signal data stream. The demultiplexed entropy encoded quantized signal is supplied to an entropy decoder 19 performing the entropy decoding of the received entropy encoded quantized signal. Subsequently, the decoded signal is supplied to an inverse quantization unit 20 and an inverse transformation unit 21. The generated residual image block or prediction error block is applied to an adder 22 which adds a temporal predictor generated by a motion compensation unit 23 of the decoder 16. The compensation unit 23 calculates on the basis of a high resolution reference image block the temporal predictor TP. This temporal predictor TP is added to the prediction error block of the video signal. As shown in the embodiment of FIG. 3, the motion compensation unit 23 receives the high resolution reference image block from a processing unit 24 which calculates at least one high resolution reference image block on the basis of previously decoded image blocks by executing a super resolution algorithm SRA. The input of the processing unit 24 is connected to a data memory 25 which can include several buffers for storing a predetermined number of previously decoded image blocks. In the shown embodiment, the data memory 25 has four buffers for storing four previously decoded image blocks.

As can be seen in FIG. 3, the demultiplexed parameter information data of the super resolution algorithm SRA employed on the encoding side can be supplied to the processing unit 24 of the video decoder 16. These demultiplexed parameter information data P can include a number of encoded reference images or image blocks or indices of encoded reference images or image blocks used by the respective super resolution algorithm SRA on the encoding side. Further, the demultiplexed parameter information data P supplied to the processing unit 24 can include a type of the used super resolution algorithm SRA of the encoder 1 and filter parameters or filters used by the respective super resolution algorithm SRA of the encoder 1.

Further, the demultiplexed parameter information data P supplied to the processing unit 24 of the decoder 16 can include a block mode indicator indicating whether the respective super resolution algorithm SRA is used for a portion of the current image block or for the complete current image block. The decoded video signal can be output at a terminal 26 of the video decoder 16 for further processing.

Similar to the encoder shown in FIG. 2, the decoder of FIG. 3 can store the same number of reference blocks and produce the same high resolution reference image block. A different number of blocks can be used for the generation of the high resolution reference image block from which the best predictor can be selected by the encoder 1. Image blocks do not necessarily have to be neighbouring image blocks. The number of image blocks and image blocks indices used by the super resolution algorithm SRA can be adaptively selected for each region of the image, e.g. block or macroblock. This can be explicitly signalled in the bit stream or derived from image properties, e.g. the amount of motion for that image region.

The selection of image blocks can be aligned with a random access pattern in the bit stream, for example no blocks prior to an IDR frame should be used.

In a possible implementation, also regular, i.e. non-high resolution reference image blocks, can be incorporated in a reference picture list. The selection can take place e.g. on a block/macroblock level. The selection can be in a possible implementation encoded into the bit stream or implicitly derived at the decoder side similar to the selection algorithm in the encoder.

In a possible embodiment, the super resolution algorithm SRA can have several steps.

In the first step, an image oversampling can be performed, wherein oversampling filters are used to create an image being multiple in size in each dimension which is band-pass bounded.

In a further step of the employed SRA algorithm, pixel matching is performed when a matching algorithm detects corresponding pixels of objects. The requirement of the pixel matching algorithm differs from the motion estimation for data compression which does not need to find a correct motion. A capable matching algorithm is for example a hierarchical block matching with a varying block size.

In a further step of the super resolution algorithm SRA, a suitable algorithm, such as block-wise motion compensation, is performed with smallest blocks of the block hierarchy according to the detected motion vectors MV.

In a further step, a superpositioning of the motion compensated images is performed. By pixel-wise addition of the oversampled motion compensated images, an image of higher range can be provided. This higher range or higher bit depth is necessary for the following post-processing operations to keep all information originally contained in the images.

Further it is possible in a further step of the super resolution algorithm SRA to perform a post-processing such as a reconstruction of image sharpness. Since the superposed image contains more detailed information and reduced noise compared with a single original image, it is possible to reconstruct the high frequencies which are not available in the original signal images. Band-pass filters can be used for that.

In a possible embodiment of the method, instead of adding up the deformed images, the pixels of the single images can be weighted differently, e.g. according to their estimated accuracy or reliability, such as pixel variances. For instance, pixels that represent full pixel positions can be weighted higher than pixels that represent sub-pixel positions, i.e. which are interpolated. The total reconstruction error can be minimized by overlaying the signals weighted by the inverse variances. Additional potential parameters for derivation of the weighting factors can include QP, temporal distance from current frame or block type or MB type or an SAD value. The weighting factor can be zero.

The pixel variances can be derived in a possible implementation, for example from noise characteristics or from an interpolation process. In a possible implementation, signal noise and quantization noise can be used for calculating the variances.

Further, it is possible that interpolation filters are employed to calculate missing intermediate pixels. There are two possibilities to define an accuracy or variance of an interpolated pixel, e.g. variances from neighbourhood or variances from an interpolation filter.

When the image statistics is independent of zooming, one can set the variance of the interpolated pixel equal to the variance of the environment of the known pixels.

Alternatively, the interpolation filter is used to predict existing values in the environment of the interpolated pixel and to calculate the prediction error. The variance of this can be used for estimating the variance of the missing, i.e. interpolated pixels.

In a possible implementation, it is ensured that the overall sum of weighting factors remains constant for each pixel of a block or frame.

In a possible embodiment, a capable band-pass filter, depending e.g. on the oversampling rate, the noise of the input signal and the rate distortion function of the coder is applied to the superimposed image to reconstruct image details.

In a possible implementation, the band-pass filtering can be optimized in a rate distortion sense.

Two components can be responsible for increasing the data rate.

The filter is adapted in a possible embodiment to the noise which can be composed e.g. of camera noise and quantization noise.

If image details change from frame to frame, the motion estimation can produce mismatches. Accordingly, an additional low-pass filter can be applied to the reference frame to enhance a matching reliability especially for low quantization values. Accordingly, a band-pass filter can be configured to fulfil the requirements.

In another approach, the reconstruction filter is adaptively derived by a minimization process for the prediction error, i.e. by comparing the prediction block signal after reconstruction with the original signal block.

In a possible embodiment, the filter parameters are signalled in the bit stream. In addition, an RDO, a rate distortion optimization, based decision can be applied to select a best combination of filter parameters with corresponding prediction error costs and signalling costs. The filter adaptation can be applied per sequence, sub-sequence, frame, slice, MB or signal block.

In a possible embodiment, a sliding window approach can be used for the calculation of the consecutive super resolution image blocks. Especially, the operations in the steps image oversampling, picture matching and image deformation can be repeated for the images used for the generation of the previous super resolution reference image block, but can be reused from the previous super resolution reference block calculation and/or from the regular motion estimation process. This is not possible, if motion compensation for the super resolution is done in the transform domain, while motion compensation for the frame resolution temporal predictor is done in the spatial domain.

Figure 4:
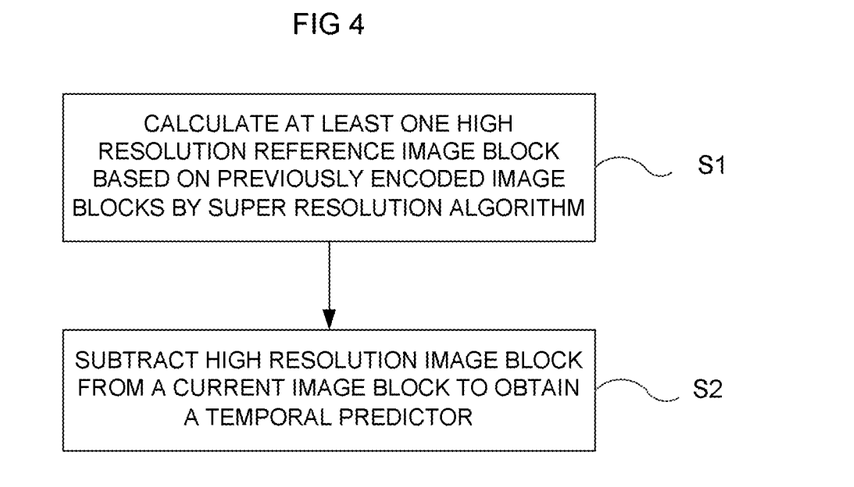
FIG. 4 is a flowchart for illustrating the possible implementation of an encoding method according to a further aspect.

FIG. 4 shows a simple flowchart for illustrating a possible implementation of the encoding method. The encoding method is provided for encoding a video signal formed of video frames each including image blocks.

In a first step S1, at least one high resolution reference image block is generated, wherein the high resolution reference image block is calculated on the basis of previously encoded image blocks by a super resolution algorithm SRA.

In a further step S2, the temporal predictor TP is calculated on the basis of the calculated high resolution image block and subtracted from a current image block.

Figure 5:
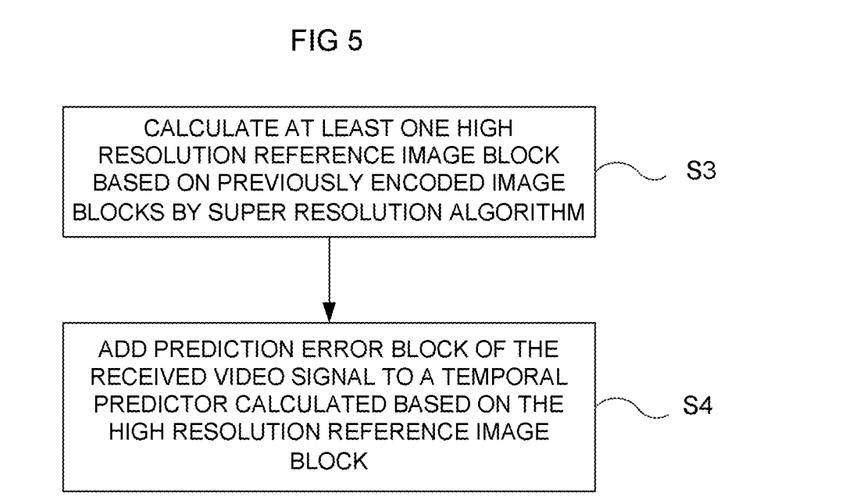
FIG. 5 is a flowchart for illustrating a possible embodiment of a decoding method for decoding a video signal according to a further aspect.

FIG. 5 shows a further flowchart for illustrating a possible implementation of a decoding method according to a further aspect. The decoding method is provided for decoding a video signal formed of video frames each including image blocks.

In a step S3, at least one high resolution reference image block is calculated on the basis of previously decoded image blocks by a super resolution algorithm.

In a further step S4, a prediction error block of the received video signal is added to a temporal predictor calculated on the basis of the generated high resolution reference image block.

FIG. 2 shows a possible embodiment of a video encoder 1 according to one aspect, and FIG. 3 shows a possible embodiment of a video decoder 16 according to another aspect.

According to a further aspect, a video codec apparatus includes a video encoder 1 such as shown in FIG. 2 and a video decoder 16 such as shown in FIG. 3 is provided.

The methods described above apply a super resolution technique for producing a more exact reference image block in the encoder and the decoder. By superposing images, the noise of the resulting image is reduced, while image details are preserved. A further advantage is that motion estimation is improved due to the reduced noise. The super resolution algorithm SRA enhances a bit depth of each pixel. Overlaying $2^n$ frames enhances the bits by n. This fact improves the quality of filtering within the coder and the reconstruction filter. Accordingly, the encoding quality in a rate distortion sense can be enhanced. Furthermore, a lower complexity due to the interaction of the motion compensation processes for a super resolution and frame resolution temporal predictor can be achieved.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. An encoder for encoding a video signal formed of video frames each including image blocks, wherein said encoder comprises:
    a processor configured to calculate at least one high resolution reference image block based on previously encoded image blocks by executing a super resolution algorithm, wherein executing the super resolution algorithm to calculate each respective high resolution reference image block includes:
        using oversampling filters to create a plurality of images having different sizes in each dimension;
        executing a matching algorithm to perform pixel matching on the oversampled images, wherein the matching algorithm detects corresponding pixels of objects in different ones of the different sized images;
        performing a motion compensation algorithm on the plurality of oversampled and pixel-matched images; and
        superimposing the plurality of pixel-matched, motion compensated images to calculate the respective high resolution reference image block; and
    a video processor configured to calculate a temporal predictor, which is subtracted from a current image block of the video signal, based on the at least one calculated high resolution reference image block;

wherein the processor is configured to use at least one of block-based and mesh-based motion compensation in executing the super resolution algorithm.

2. The encoder according to claim 1, wherein the processor is configured to calculate the at least one high resolution reference image block in a spatial domain.

3. An encoding method for encoding a video signal formed of video frames each including image blocks, wherein said encoding method comprises:
    generating at least one high resolution reference image block which is calculated based on previously encoded image blocks by executing a super resolution algorithm, wherein executing the super resolution algorithm to calculate each respective high resolution reference image block includes:
        using oversampling filters to create a plurality of images having different sizes in each dimension;
        executing a matching algorithm to perform pixel matching on the oversampled images, wherein the matching algorithm detects corresponding pixels of objects in different ones of the different sized images;
        performing a motion compensation algorithm on the plurality of oversampled and pixel-matched images; and
        superimposing the plurality of pixel-matched, motion compensated images to calculate the respective high resolution reference image block; and
    calculating, based on the at least one high resolution reference image block, a temporal predictor which is subtracted from a current image block;
    wherein executing the super resolution algorithm comprises applying at least one of block-based and mesh-based motion compensation.

4. The encoding method according to claim 3, wherein pixel matching on the oversampled images is performed on the basis of motion vectors determined in motion estimation which supplies a motion vector to the motion compensation algorithm which calculates a temporal predictor.

5. The encoding method according to claim 4,
    wherein parameter information data of the super resolution algorithm includes previously encoded reference images or image blocks and/or indices of previously encoded reference images or image blocks used by the respective super resolution algorithm, and/or a type of the used super resolution algorithm, and/or filter parameters of filters used by the respective super resolution algorithm, and/or a block mode indicator indicating whether the respective super resolution algorithm is used for at least a portion of the current image block, and
    wherein the parameter information data of the super resolution algorithm and/or motion vectors provided by motion estimation of the super resolution algorithm are encoded as side information or as part of the encoded video signal.

6. A decoder for decoding a video signal formed of video frames each including image blocks, wherein said decoder comprises:
    a processor configured to calculate at least one high resolution reference image block based on previously decoded image blocks by executing a super resolution algorithm, wherein executing the super resolution algorithm to calculate each respective high resolution reference image block includes:
        using oversampling filters to create a plurality of images having different sizes in each dimension;
        executing a matching algorithm to perform pixel matching on the oversampled images, wherein the matching algorithm detects corresponding pixels of objects in different ones of the different sized images;
        performing a motion compensation algorithm on the plurality of oversampled and pixel-matched images; and
        superimposing the plurality of pixel-matched, motion compensated images to calculate the respective high resolution reference image block; and
    a video processor configured to calculate a temporal predictor, which is added to a prediction error block of the video signal, based on the at least one high resolution reference image block;
    wherein the processor is configured to use at least one of block-based and mesh-based motion compensation in executing the super resolution algorithm.

7. The decoder according to claim 6, wherein the processor is configured to calculate the at least one high resolution reference image block in the spatial domain.

8. A decoding method for decoding a video signal formed of video frames each including image blocks, wherein said decoding method comprises:
    generating at least one high resolution reference image block based on previously decoded image blocks by executing a super resolution algorithm, wherein executing the super resolution algorithm to calculate each respective high resolution reference image block includes:
        using oversampling filters to create a plurality of images having different sizes in each dimension;
        executing a matching algorithm to perform pixel matching on the oversampled images, wherein the matching algorithm detects corresponding pixels of objects in different ones of the different sized images;
        performing a motion compensation algorithm on the plurality of oversampled and pixel-matched images; and
        superimposing the plurality of pixel-matched, motion compensated images to calculate the respective high resolution reference image block; and
    adding to a prediction error block of the video signal a temporal predictor calculated based on the at least one high resolution reference image block;
    wherein executing the super resolution algorithm comprises applying at least one of block-based and mesh-based motion compensation.

9. The decoding method according to claim 8, wherein the pixel matching on the oversampled images is performed based on motion vectors used in motion compensation which calculates a temporal predictor.

10. The decoding method according to claim 9,
    wherein parameter information data of the super resolution algorithm includes a number of previously decoded reference images or image blocks and/or indices of previously decoded reference images or image blocks used by the respective super resolution algorithm, and/or a type of the used super resolution algorithm, and/or filter parameters of filters used by the respective super resolution algorithm, and/or a block mode indicator indicating whether the respective super resolution algorithm is used for at least a portion of the current image block, and
    wherein the parameter information data of at least one of the super resolution algorithm and motion vectors used by motion compensation of the super resolution algorithm are decoded as side information or as part of the encoded video signal and used in the decoding process.

11. A video codec apparatus comprising:

an encoder for encoding a first video signal formed of video frames each including image blocks, including a first processor configured to calculate at least one high resolution reference image block based on previously encoded image blocks by executing a super resolution algorithm to perform local motion compensation, wherein executing the super resolution algorithm to calculate each respective high resolution reference image block includes:
  using oversampling filters to create a plurality of images having different sizes in each dimension;
  executing a matching algorithm to perform pixel matching on the oversampled images, wherein the matching algorithm detects corresponding pixels of objects in different ones of the different sized images;
  performing a motion compensation algorithm on the plurality of oversampled and pixel-matched images; and
  superimposing the plurality of pixel-matched, motion compensated images to calculate the respective high resolution reference image block;

a first video processor configured to calculate a temporal predictor, based on the at least one high resolution reference image block; and a decoder for decoding a second video signal encoded by the super resolution algorithm performing local motion compensation, including
  a second processor configured to calculate the at least one high resolution reference image block based on previously decoded image blocks by executing the super resolution algorithm to perform local motion compensation; and
  a second video processor configured to calculate a temporal predictor, based on the at least one high resolution reference image block;

wherein the first and second processors are configured to use a mesh-based motion compensation in executing the super resolution algorithm.

12. The encoding method according to claim 1, wherein parameter information data of the super resolution algorithm includes a block mode indicator indicating whether the respective super resolution algorithm is used for at least a portion of the current image block.

13. The encoding method according to claim 1, wherein super resolution pixels of a single image are weighted differently according to at least one of estimated accuracy and reliability.

14. The encoding method according to claim 13, wherein the super resolution pixels of the single image are weighted differently according to pixel variances.

15. An encoder for encoding a video signal formed of video frames each including image blocks, wherein said encoder comprises:

a processor configured to calculate at least one high resolution reference image block based on previously encoded image blocks by executing a super resolution algorithm to perform local motion compensation, wherein executing the super resolution algorithm to calculate each respective high resolution reference image block includes:
  using oversampling filters to create a plurality of images having different sizes in each dimension;
  executing a matching algorithm to perform pixel matching on the oversampled images, wherein the matching algorithm detects corresponding pixels of objects in different ones of the different sized images;
  performing a motion compensation algorithm on the plurality of oversampled and pixel-matched images; and
  superimposing the plurality of pixel-matched, motion compensated images to calculate the respective high resolution reference image block;

a video processor configured to calculate a temporal predictor, based on the at least one high resolution reference image block; and a subtractor receiving a current image block of the video signal and subtracting therefrom the temporal predictor to produce a prediction error of the current image block;

wherein the processor is configured to use at least one of block-based and mesh-based motion compensation in executing the super resolution algorithm.

16. An encoder for encoding a video signal formed of video frames each including image blocks, wherein said encoder comprises:

a processor configured to calculate at least one high resolution reference image block based on previously encoded image blocks by executing a super resolution algorithm to perform local motion compensation, wherein executing the super resolution algorithm to calculate each respective high resolution reference image block includes:
  receiving a plurality of previously encoded image blocks;
  using oversampling filters to create a plurality of images having different sizes in each dimension;
  executing a matching algorithm to perform pixel matching on the oversampled images, wherein the matching algorithm performs hierarchical block matching with a block hierarchy defining a varying block size;
  executing a block-wise motion compensation algorithm with smallest blocks of the block hierarchy according to detected motion vectors; and
  superimposing the plurality of pixel-matched, motion compensated images to calculate the respective high resolution reference image block; and a video processor configured to calculate a temporal predictor, based on the at least one high resolution reference image block.

\* \* \* \* \*